Figures 1, 2:
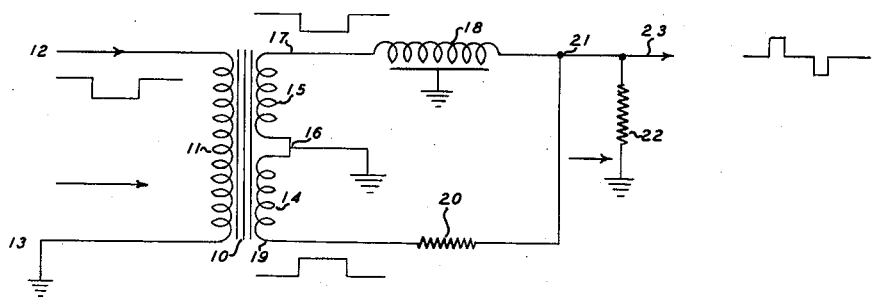

May 23, 1950 — G. D. FORBES — 2,508,569
PULSE SHORTENING CIRCUIT
Filed Jan. 13, 1944

INVENTOR.
GORDON D FORBES
BY
Attorney

Patented May 23, 1950

2,508,569

UNITED STATES PATENT OFFICE 2,508,569

PULSE SHORTENING CIRCUIT

Gordon Donald Forbes, Sudbury, Mass., assignor, by mesne assignments, to the United States of America as represented by the Secretary of War Application January 13, 1944, Serial No. 518,154

11 Claims. (Cl. 178—44)

1

The invention described herein may be manufactured and used by or for the Government for governmental purposes, without the payment to me of any royalty thereon.

This invention relates to a pulse shortening circuit and provides means for operating on a pulse having a predetermined duration to obtain one or more pulses having substantially less duration. The invention in general contemplates the use of a pulse transformer wherein the original pulse to be operated upon is fed into the primary. The transformer has two secondary circuits with different delays in each circuit. The two resulting pulses may be combined in a subtractive manner to obtain a resultant output.

Referring to the drawing, Figure 1 is a circuit diagram illustrating the invention. Figure 2 is a chart showing the voltage pulses.

A pulse transformer 10 has a primary 11 having terminals 12 and 13 into which a pulse may be fed. The transformer has two secondaries 14 and 15 which are preferably similar and are connected to a grounded common terminal 16. Secondary winding 15 has its outer terminal 17 connected to a delay line 18. Delay line 18 may be of any type and in its simplest form may consist of an inductance.

Secondary winding 14 has its outer terminal 19 connected to a resistance 20, and the circuit continues on to junction 21 joining the delay line circuit. Both secondary windings are connected in opposition to each other with a pair of series connected impedances forming part of the circuit. It is preferred to have the value of resistance 20 equal to the resistance of delay line 18. With windings 14 and 15 equal, the attenuation suffered by the pulses in the two secondary windings will be equal. The circuit is preferably terminated by a resistance 22 connected between ground and output 23 with the value of resistance 22 being substantially equal to the characteristic impedance of delay line 18. It is understood that 22 may be an impedance rather than a resistance. However, it is preferred to match the impedance to the pulse system so that reflections will be avoided.

Assuming that a negative pulse is impressed upon primary 12, positive and negative pulses will be induced in windings 14 and 15. Delay line 18 will cause a time displacement of the pulse induced in winding 15 relative to the pulse induced in winding 14 as seen when the pulses are combined at junction 21. Since the resistances of 18 and 20 are equal, the amplitude of the pulses will be equal. By adjusting or controlling the amount of delay, any desired displacement

2 of one induced pulse with respect to the other induced pulse may be obtained.

The output as shown in Figure 2 will consist of positive and negative pulses and may be utilized in any manner desired. Thus one of these pulses may be eliminated in the usual manner by the use of a diode or similar means.

What is claimed is:

1. A pulse shortening circuit comprising a pulse transformer having a primary receiving pulses, a pair of secondary windings having a grounded common terminal and two outer terminals, said secondary windings being connected in series-aiding relation, means for connecting the outer terminals of said secondary windings to each other, said means including a pair of impedances having different retardation effects on induced pulses, and an output circuit connected between the junction point between said two impedances and ground, said output circuit having an impedance equal to a characteristic impedance of the pulse shortening system for matching the impedance of said pulse shortening system.

2. The system as defined in claim 1 wherein said secondary windings have substantially equal impedances and said series impedances have substantially equal resistances.

3. A pulse-shortening circuit comprising a pulse transformer having primary and secondary windings, said primary being connected to a source of pulses, a delay line and a substantially pure resistor forming a closed series circuit with said secondary winding, and an output circuit connected between the center of said secondary winding and the junction point between said line and said resistance.

4. A pulse-shortening circuit as defined in claim 3 in which the resistance of said delay line is substantially equal to the ohmic resistance of said resistor.

5. A pulse-shortening circuit as defined in claim 3 in which the impedance of the output circuit matches the impedance connected across said output circuit on the input side of said output circuit, and in which the resistance component of said line is equal to the resistance of said resistor.

6. A pulse-shortening circuit comprising a pulse transformer having a primary and a secondary winding, said primary winding being connected to a source of pulses, a center tap on said secondary winding, said tap being connected to ground, said center tap dividing said secondary winding into two electrically equal parts, serially connected inductance and resistor connected across said secondary winding, the resistance of said inductance being equal to the resistance of said resistor, and an output circuit connected between the junction of said inductance and resistance on one side and ground on the other side, the reactive and resistive components of the impedance of said coil being adjusted to produce positive and negative pulses in said output circuit as the result of two currents of opposite polarities impressed on said output circuit by said two parts of said secondary winding.

7. A pulse shortening circuit comprising a pulse transformer having a primary receiving pulses, a secondary having an intermediate terminal and two outer terminals to provide oppositely phased potentials with respect to said intermediate terminal, a pair of impedances having a difference in retardation effect on said pulses connected in a closed series circuit between said outer terminals, the amount of said difference being less than the duration of said pulses, and an output circuit connected between said intermediate terminal and the junction between said pair of impedances, said output circuit having an impedance equal to a characteristic impedance of the pulse shortening circuit.

8. A system as defined in claim 7, wherein the impedance of both portions of said secondary between said intermediate terminal and the respective outer terminals have substantially equal impedances and said series-connected impedances have substantially equal resistances.

9. A pulse-transforming circuit comprising a pulse transformer having primary and secondary windings, said primary being connected to a source of pulses, a pair of impedances respectively having different delay properties for substantially all components of said pulses and forming a closed series circuit with said secondary winding, and an output circuit connected between an intermediate point on said secondary winding and the junction point of said impedances.

10. A pulse-transforming circuit comprising a pulse transformer having primary and secondary windings, said primary being connected to a source of pulses, a delay line and a substantially pure resistor forming a closed series circuit with said secondary winding, and an output circuit connected between an intermediate point on said secondary winding and the junction point between said line and said resistance.

11. A system for modifying the output of a single source of spaced, discrete pulses, comprising a pair of circuit means adapted to be coupled to said source for respectively deriving therefrom pulses which vary in opposite directions, said circuit means respectively having a substantially equal difference in retardation effect upon substantially all components of said pulses, the amount of said difference being less than the duration of said pulses, and means coupled to both circuit means to derive an output having an instantaneous amplitude equal to the algebraic sum of the instantaneous amplitudes of the pulse components in said pair of circuit means.

GORDON DONALD FORBES.

REFERENCES CITED

The following references are of record in the file of this patent:

UNITED STATES PATENTS

| Number | Name | Date |
| --- | --- | --- |
| 2,190,504 | Schlesinger | Feb. 13, 1940 |
| 2,226,459 | Bingley | Dec. 24, 1940 |
| 2,252,442 | Schlesinger | Aug. 12, 1941 |
| 2,287,174 | Heising | June 23, 1942 |